United States Patent
Coutarel et al.

(10) Patent No.: US 6,966,344 B2
(45) Date of Patent: Nov. 22, 2005

(54) DEVICE FOR LIMITING THE LATERAL BUCKLING OF ARMOURING PLIES OF A FLEXIBLE PIPE

(75) Inventors: Alain Coutarel, Mont-Saint-Aignan (FR); Fabrice Bectarte, Rouen (FR)

(73) Assignee: Technip France, (FR)

( * ) Notice: Subject to any disclaimer, the term of this patent is extended or adjusted under 35 U.S.C. 154(b) by 0 days.

(21) Appl. No.: 10/509,460

(22) PCT Filed: Mar. 17, 2003

(86) PCT No.: PCT/FR03/00849

§ 371 (c)(1),
(2), (4) Date: Sep. 28, 2004

(87) PCT Pub. No.: WO03/083343

PCT Pub. Date: Oct. 9, 2003

(65) Prior Publication Data

US 2005/0115623 A1    Jun. 2, 2005

(30) Foreign Application Priority Data

Mar. 28, 2002   (FR) .................................. 02 03928

(51) Int. Cl.[7] .............................................. F16L 11/00
(52) U.S. Cl. ........................ 138/129; 138/138; 138/144
(58) Field of Search ............................. 138/129, 135, 138/130, 137, 138, 144, 148

(56) References Cited

U.S. PATENT DOCUMENTS

| | | | | |
|---|---|---|---|---|
| 3,559,693 A | | 2/1971 | Reynard | |
| 3,729,028 A | * | 4/1973 | Horvath et al. | 138/130 |
| 5,110,644 A | | 5/1992 | Fuchs et al. | |
| 5,261,462 A | * | 11/1993 | Wolfe et al. | 138/130 |
| 5,275,209 A | | 1/1994 | Sugier et al. | |
| 5,406,984 A | * | 4/1995 | Sugier et al. | 138/135 |
| 5,730,188 A | | 3/1998 | Kalman et al. | |
| 5,758,694 A | * | 6/1998 | Friedrich et al. | 138/144 |
| 6,003,561 A | * | 12/1999 | Brindza et al. | 138/124 |
| 6,039,083 A | * | 3/2000 | Loper | 138/135 |
| 6,123,114 A | * | 9/2000 | Seguin et al. | 138/124 |
| 6,668,866 B2 | * | 12/2003 | Glejbol et al. | 138/134 |
| 6,843,278 B2 | * | 1/2005 | Espinasse | 138/134 |

* cited by examiner

*Primary Examiner*—James Hook
(74) *Attorney, Agent, or Firm*—Ostrolenk, Faber, Gerb & Soffen, LLP

(57) ABSTRACT

For limiting the lateral buckling of tensile armor plies of an underwater flexible pipe, that can be used in the offshore oil industry, the plies include from the outside inward, at least one external polymer sheath, a first outward retention layer of a defined thickness $K_1$ wound around an upper outer tensile armor ply, at least one second inward retention layer of a defined stiffness $K_2$ wound around each of at least one lower inner tensile armor ply. Stiffness $K_2$ is preferably less than stiffness $K_1$, i.e., the retention layers outward are less stiff. There is then an internal polymer sheath.

11 Claims, 1 Drawing Sheet

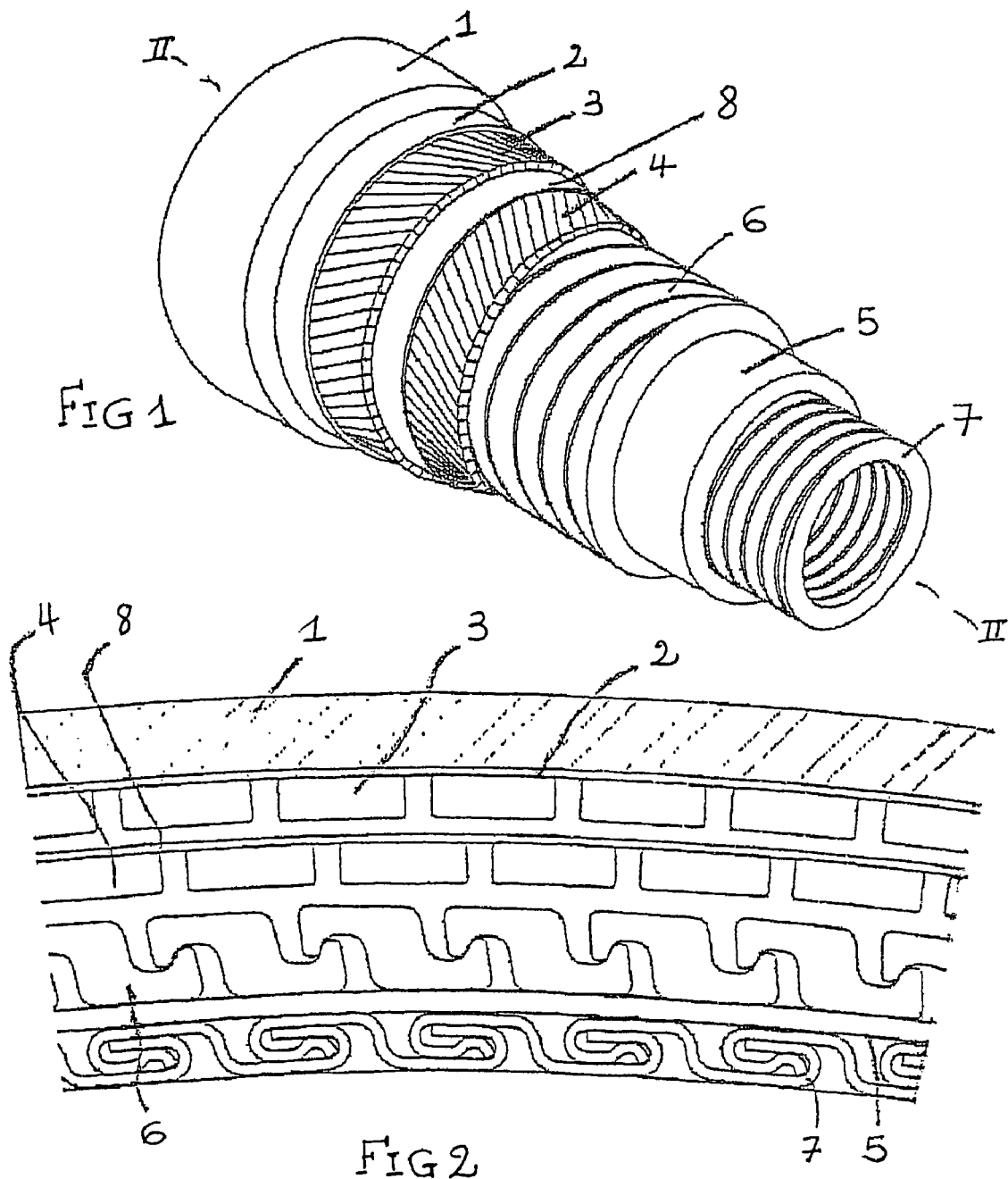

DEVICE FOR LIMITING THE LATERAL BUCKLING OF ARMOURING PLIES OF A FLEXIBLE PIPE

PRIORITY CLAIM

This is a U.S. national stage of application No. PCT//FR03/00849, 17 Mar. 2003, Priority is claimed on that application and on the following application:
Country: France, Application No. 02/03928. Filed 28 Mar. 2002.
The PCT International application was published in the French language.

BACKGROUND OF THE INVENTION

The present invention relates to a device for limiting the lateral buckling of the tensile armor plies of a flexible pipe.

The flexible pipe at which the present invention is aimed is, in particular, of the unbonded type and used in offshore production. Flexible pipes as defined in the American Petroleum Institute recommendation API 17J generally comprise one or more polymer layers and metal reinforcing layers such as tensile armor plies, a carcass and/or a pressure vault. The nature, number, size and organization of these layers are essentially determined by the conditions of use of the flexible pipes concerned and by the way they are laid, as defined in recommendation API 17J.

When the flexible pipe, regardless of its nature, is subjected to an external pressure Pe that is higher than the internal pressure, axial compression may arise and this is known as the reverse end-wall effect. The reverse end-wall effect has a tendency to compress the armor and to shorten the length of the flexible pipe and increase its diameter, this increase in diameter has the effect of causing the armors to swell. Under certain conditions, for example with an unsealed external sheath and regardless of whether the pipe is straight or curved, the armors can buckle in a radial mode and take on a "bird cage" shape. Another mode of buckling of the tensile armors due to the compressive stresses that they experience due to the reverse end-wall effect is known as lateral buckling, which can arise when the flexible pipe is bent and regardless of the condition of the external sheath. This lateral buckling is often accompanied by overlapping of the armor wires of any ply which, when they part laterally under too high a stress, overlap the armor wire next to them.

When the polymer external sheath of the flexible pipe is punctured for any reason, the pressure in the annulus, which is delimited between said external sheath and the pressure sheath and in which the tensile armors are placed, is equal to the hydrostatic pressure. Under such conditions, the external sheath is no longer pressed firmly against the tensile armors and radial swelling of said tensile armors, likely to arise following the ingress of water into the annulus, is no longer prevented by the external sheath.

Furthermore, the friction existing between the armor plies and generated by the combination of the effects of the external pressure and of the dynamic stresses is likely to cause the wires to migrate and therefore to cause a localized increase in the lateral clearances between the wires of one and the same armor ply. The appearance of these clearances leads, under certain conditions, to lateral buckling of the armor wires, this occurring regardless of the condition of the external sheath.

One of the solutions adopted for reducing the risk of lateral and/or "bird cage" radial buckling and for reducing the armor swelling connected with the reverse end-wall effect was to wind tapes or layers of aramid fibers such as "Kevlar" around the last armor ply. In that way, the armor plies were thus allowed to swell by an amount $\Delta R$ which had to be less than half the thickness of the last armor wire. Thus, the swelling of the armor plies was limited while also reducing the risk of the armor plies overlapping.

However, while this solution is able to solve the problems associated with radial buckling, all it can do is limit the risk of lateral buckling, which remains. This is because, depending on the conditions of use of the flexible pipe and, in particular, when this pipe experiences static stresses due to the reverse end-wall effect which are combined with variations in curvature and with dynamic stresses in use, the phenomenon of lateral buckling remains. Now, when an armor wire moves laterally as a result of lateral buckling, it carries with it the other armor wires of the ply. The result is that the flexible pipe is, if not destroyed, at least rendered unservicable, and has to be changed because repairing a flexible pipe is not an economically viable proposition.

In a flexible pipe comprising a sealed external sheath, the rubbing of the plies against each other generates contact pressure which causes the armor wires to move; the experts say that the armor wires "migrate". As a result of these successive and, repeated movements, the armor wires end up becoming inelastic because of plastic deformation. These migrations of the armor wires may lead to the formation of a small clearance between the successive turns and, during compression or shortening of the flexible pipe, lateral buckling of the armors occurs.

Already known, from the documents U.S. Pat. No. 5,730,188, WO 01/33129 or U.S. Pat. No. 5,275,209, are windings of antiwear layers wound around the tensile armor layers. These antiwear layers are known in API 17J. They are made of a polymer and their sole purpose is to reduce the wear of the plies by reducing friction between the plies, preventing metal-to-metal contact of the shaped wires that make up the plies. These layers have no effect on lateral buckling.

SUMMARY OF THE INVENTION

It is an object of the present invention to overcome the aforementioned disadvantages and to propose a solution that can be used both in the case of a rough bore flexible pipe, that is to say one comprising a metal carcass by way of innermost element, and in a smooth bore flexible pipe, in which the innermost element is a plastic sheath.

The subject of the present invention is a device for limiting the lateral buckling of the tensile armor plies of a flexible pipe. For limiting the lateral buckling of tensile armor plies of an underwater flexible pipe, that can be used in the offshore oil industry comprising, the plies include from the outside inward, at least one external sheath preferably of a polymer, a first outward retention layer of a defined thickness $K_1$ wound around an upper, outer tensile armor ply, at least one second inward retention layer of a defined stiffness $K_2$ wound around one or each of at least one lower inner tensile armor ply. Stiffness $K_2$ is preferably less than stiffness $K_1$, i.e., the retention layers outward are less stiff. There is also an internal sheath preferably of a polymer.

One advantage of the present invention lies in the fact that each armor ply is prevented from swelling radially by the retention layer that surrounds it regardless of the condition of the external polymer sheath and in particular when the latter is not sealed, whether or not this absence of sealing is intentional, so that the risk of lateral buckling of the armor plies is greatly reduced.

According to another feature of the invention, the second retention layer which is radially more inward and over an inward armor ply has a stiffness $K_2$ which is greater than the stiffness $K_1$ of the first retention layer which is radially more outward and over a more outward armor ply, so that a clearance is formed between the upper or outward armor ply and the second retention layer over the lower or inward armor ply during swelling, if swelling occurs. In that way, the two armor plies are independent of one another and the rubbing-together of the armor plies which may occur when the flexible pipe is being bent, is, if not entirely eliminated, at least greatly reduced so that the risk of lateral buckling is greatly reduced.

Another advantages lies in the fact that the apparent total stiffness KT of the assembly is greater than the sum of the stiffnesses $K_1+K_2$. In this way, less material is used in the retention layers, and this is advantageous from an economical point of view especially when the retention layers are made of Kevlar which is a particularly expensive material.

Other advantages and features will become apparent from reading about one embodiment of the present invention and from the appended drawings.

BRIEF DESCRIPTION OF THE DRAWINGS

FIG. 1 is a partial perspective view of a flexible pipe equipped with a device as claimed in the invention; and FIG. 2 is a view in longitudinal section of the pipe of FIG. 1.

The pipe depicted in FIG. 1 comprises, from the outside inward, at least one external polymer sealing sheath 1, a first radially outward retention layer 2 of total stiffness Ki wound around an upper or outward tensile armor ply 3, a lower or inward tensile armor ply 4 and an internal polymer sheath 5. The tensile armor plies are obtained by long-pitch winding of a shaped metal or composite wire in opposite directions as seen in FIG. 1. The structure of a flexible pipe like the one described hereinabove is the simplest that can be produced. Indeed, those skilled in the art know that when the lay angles of the wires that make up the upper 3 and lower 4 armor plies are close to 55°, and are wound in opposite directions, the presence of a pressure vault, like the one depicted in FIG. 1 at reference 6, is not essential. Likewise, just two armor plies 3 and 4 are depicted, although in general other armor plies may be wound around the longitudinal axis of the pipe. The armor ply 3 is said to be the upper one because it is the last or radially outward one, starting from the inside of the pipe, before the external sealing sheath 1. Likewise, when reference is made to a retention layer 2, this means that it may be made up of several bands, ribbons, tapes or unitary elements wound with a short pitch contiguously and/or one over the other, around the upper armor ply 3.

The unitary elements of the retention layers have high longitudinal strength along their longitudinal axis and low longitudinal compression strength. Such a low compression strength is desired so as to significantly reduce the radial clamping forces of the laying tensioners during the various flexible-pipe-handling operations. Thus, the unitary elements of the retention layers may be made of various appropriate materials, for example they may be formed using a woven or nonwoven made of aramid fiber. It is also possible to use a flat textile tape consisting of a more or less rectangular central section and of two longitudinal edges which are thinner than the central section, as described in Patent Application FR 01 10 818 in the name of the applicant company.

The internal polymer sheath 5 surrounds a metal carcass 7 which consists of the short-pitch winding of an interlocked metal strip or shaped wire about the longitudinal axis, the winding angle of which is close to 80 or 90°.

The flexible pipe thus described, in a simple structure, is said to be a rough bore pipe because it has a metal carcass 7 as its innermost element. Were the flexible pipe not to have a metal carcass and were it to have the polymer sheath 5 as its innermost element, it would then be said to be a smooth bore pipe. Regardless of the type of flexible pipe, the device as claimed in the invention can be used in said the flexible pipe.

According to the invention, a second, lower, radially inward retention layer 8 is arranged around the lower armor ply 4. That retention layer has a defined stiffness $K_2$. Of course, when the flexible pipe has several armor plies lying below the upper armor ply 3, these would be considered to be lower layers and a retention layer of defined stiffness K would be wound around each of them, it being emphasized that the stiffnesses K of each of the lower armor plies could be the same or could differ if necessary. In the preferred embodiment of the invention, the stiffness $K_2$ of the lower retention layers with respect to the first retention layer 2 considered as being the upper retention layer differs from the stiffness $K_1$. As a preference, the retention layers 2 and 8 are made of a very strong material such as the material known by the name of Keviar and more generally from an aramid. The stiffness K of a retention layer is the constant connecting the maximum swelling of the armor ply retained by said retention layer with respect to its initial position (absolute clearance $\Delta R$) to the pressure P exerted on the armor ply, this being so, in the case of an unsealed sheath, for a straight flexible pipe. This then gives the equation $\Delta R=P/K$. For a given structure, the constant is dependent on the lay angles of the armor plies and on the wrapping angles of the retention layer and on parameters and properties of the material of which the unitary elements that make up the layer used are made. It is determined during the flexible pipe design phase so as to limit the clearance $\Delta R$ to below a desired value of "k" times the thickness e of the armor wire of the layer, for example below 0.3e. This maximum clearance is determined for a straight flexible pipe. When the pipe is bent, this clearance is distributed nonuniformly, in a way that can be calculated.

Thus, as each lower armor ply 4 is made independent of the others via the retention layer that surrounds it, radial swelling is, if not prevented, at least limited to a desired value, and this is so regardless of the condition of the external polymer sheath 1 and, in particular, if the sheath is punctured. What then happens, if the external sheath 1 is punctured or torn, is that water enters the flexible pipe and such an invasion of its annulus causes radial swelling of the armor and encourages phenomena associated with the lateral buckling of the tensile armors to occur.

When swelling occurs for any reason, for example due to the reverse end-wall effect, each lower ply 4 is either prevented from swelling or limited in its swelling as a result of the clamping exerted on it by the adjacent retention layer.

In the foregoing, when reference is made to the stiffness K, $K_1$ or $K_{21}$ it must be understood that the stiffness in question is the total stiffness of the retention layer.

In the embodiment, the stiffness $K_2$ of the lower retention layer 8 is greater than the stiffness $K_1$ of the upper retention layer 2. In general and when the flexible pipe has several retention layers as is the case when there is more than one lower armor ply, each of them then being associated with a retention layer, the stiffness of the retention layers decreases from the inside of the flexible pipe outward. In other words, the stiffness of the lowermost retention layer is higher than that of the next retention layer lying above it, and so on as far as the upper retention layer 2 which has a lower stiffness than each of the other retention layers of the flexible pipe.

Thus, when the armor plies swell radially, for example as a result of the reverse end-wall effect, a clearance is produced between the retention layer and the armor ply lying above it. This small clearance makes each subassembly, consisting of a retention layer and an associated lower armor ply, almost independent of the other similar subassemblies and of the upper armor ply 3. Because of the presence of the controlled radial clearance between the various subassemblies, the upper armor ply is not retained as firmly as the armor ply lying below, and the radial clearance created is controlled in such a way that, between two successive subassemblies, it is at most equal to 30% of the thickness e of the armor wire. Thus, a structure is obtained in which the various armor plies are dissociated from one another by virtue of the appearance of the radial clearance, thereby advantageously making it possible to eliminate interactions caused by friction between the armor plies, which interactions, as recalled earlier, present a significant risk of lateral buckling. In addition, as the armor plies are held tightly within the retention layers, it then follows that the risk of the armor wires of any one layer overlapping is very greatly reduced, if not to say completely eliminated. When the stiffnesses $K_1$ and $K_2$ are identical, the armor plies will swell by the same amount $\Delta R$ with respect to their initial position. They will therefore remain separated only by the retention layer (the same displacement, and therefore no radial clearance is created). However, the armor plies will be retained independently of one another, thus reducing contact pressures between them and therefore reducing migration phenomena in any one armor ply and consequently the risks of lateral buckling. As may be seen, the present invention can be defined by two aspects. The first aspect concerns the reduction in contact pressures between the armors, which is one cause of lateral buckling, it being emphasized that this reduction is obtained even when $K_1=K_2$, as was specified above. The second aspect concerns the maintaining of the clearance $\Delta R'$, which is the relative clearance between each armor ply during radial swelling (punctured sheath and straight flexible pipe) and which differs from the clearance $\Delta R$, which is the absolute clearance with respect to the initial position before swelling. The clearance $\Delta R'$ is kept below a defined value, which is preferably fixed at 30% of the thickness e of the armor wire. The purpose of keeping the clearance below 30% of the thickness e is to reduce the risk of overlap in any one ply, even when the flexible pipe is bent.

Another advantageous aspect of the present invention is that the total amount $Q_{TI}$ of Kevlar needed to hold each armor ply is less than the amount $Q_{TA}$ that would be needed in the solution of the prior art. What happens is that the single retention layer, consisting of one or several superposed layers wound around the upper armor ply, had to prevent the last armor ply from swelling by more than n times e and, preferably, less than 0.3e. This being the case, it was essential to use an amount of product $Q_{TA}$ that may be considered as being equal to a multiple of the unitary amount for preventing each ply from swelling by more than 0.3e. In other words, if $Q_i$ is needed for each armor ply, the total amount $Q_{TA}$ is equal to $2Q_i$. Because of the dissociation between the subassemblies of the present invention, an amount of product equal for example to $Q_i$ is needed to immobilize the lower armor ply and allow swelling of only less than 0.3e. In the case of the armor ply lying immediately above, the amount of product $Q'_i$ is lower because the allowed swelling can be as much as 0.6e. In consequence, the total amount $Q_{TI}$ of product needed in the present invention is $Q_i+Q'_i<2Qi$ since $Q'_i<Q_i$. However, it must be emphasized that the amount $Q_{TI}$ needed to limit the relative swelling $\Delta R'$ between two armor plies to 30% of the thickness e is less than the amount $Q_{TA}$ needed in the prior art to limit the swelling $\Delta R$ of the armor plies to 30% of the thickness e, this being for the same given flexible pipe structure under the same conditions.

This amounts to stating that the apparent total stiffness KT of the retention layers is greater than the sum of the stiffnesses $K_1+K_2+\ldots K_n$ of each retention layer. Thus, less Kevlar is used around each retention layer. An arrangement considered to be optimal is the one in which $K_2=2K_1$, which results in there being the same relative clearance between the subassemblies.

The small clearances or gaps that may arise between the subassemblies are less than 50% of the thickness e of the thinnest armor ply and preferably less than 0.3e. As recalled hereinabove, each retention layer can be made up of several unitary layers or elements superposed on one another. In this case, the tension in each unitary element of the retention layer is chosen so that it is less than 50% of the tensile strength of said unitary element.

It goes without saying that the nature of the unitary elements within the same layer can be mixed.

What is claimed is:

1. An underwater flexible pipe for limiting lateral buckling of tensile armor plies of the pipe, wherein, from outside the pipe inward the pipe comprises:
    an external sheath;
    a first upper retention layer; an upper, radially outward tensile armor ply wound in a long pitch helix, and the first retention layer being wound around the upper tensile armor ply;
    at least one second lower retention layer; at least one lower, radially inward tensile armor ply in a long pitch helix wherein a respective at least one second retention layer is wound around each of the lower tensile armor plies; and
    an internal sheath inward of the at least one lower tensile armor ply;
    wherein the first upper retention layer and the second lower retention layer have respective stiffnesses $K_1$ and $K_2$ selected so that the retention layers limit the swelling of the tensile armor plies underlying the retention layers and wherein the first retention layer stiffness $K_1$ differs from the second retention layer stiffness $K_2$.

2. The pipe of claim 1, wherein the external sheath is a polymer sheath and the internal sheath is a polymer sheath.

3. The pipe of claim 2, wherein the internal polymer sheath is the innermost element of the pipe.

4. The pipe of claim 1, wherein the second retention layer stiffness $K_2$ is greater than the first retention layer stiffness $K_1$.

5. The pipe of claim 4, wherein the upper tensile armor ply and the first retention layer define an upper subassembly, and at least one of the second retention layers and the respective at least one lower tensile armor ply define a lower subassembly; the retention layers wound and by the respective lower tensile armor plies are selected and are of such a material that upon swelling of the lower subassembly, a radial clearance is produced between two consecutive ones of the subassemblies in the radial direction such that the subassemblies are thereby disassociated from one another and separated by the radial clearance.

6. The pipe of claim 5, wherein each of the armor plies is comprised of an armor wire, and the radial clearance is less than 0.3e, wherein e is the thickness of the armor wire of the armor ply of the lower subassembly.

7. The pipe of claim 1, wherein each of the retention layers is comprised of several unitary elements wound around the respective armor ply, and each of the unitary elements has along its longitudinal axis high tensile strength and low compression strength.

8. The pipe of claim 7, wherein each of the unitary elements of the retention layer is comprised of a woven or a non-woven aramid fiber material.

9. The pipe of claim 7, wherein the unitary element of a retention layer has a tension that is less than 50% of the tensile strength of the respective unitary element.

10. The pipe of claim 1, wherein each of the retention layers is comprised of an aramid.

11. The pipe of claim 1, wherein the flexible pipe includes a metal carcass as an innermost element inward of the internal sheath.

* * * * *